UNITED STATES PATENT OFFICE.

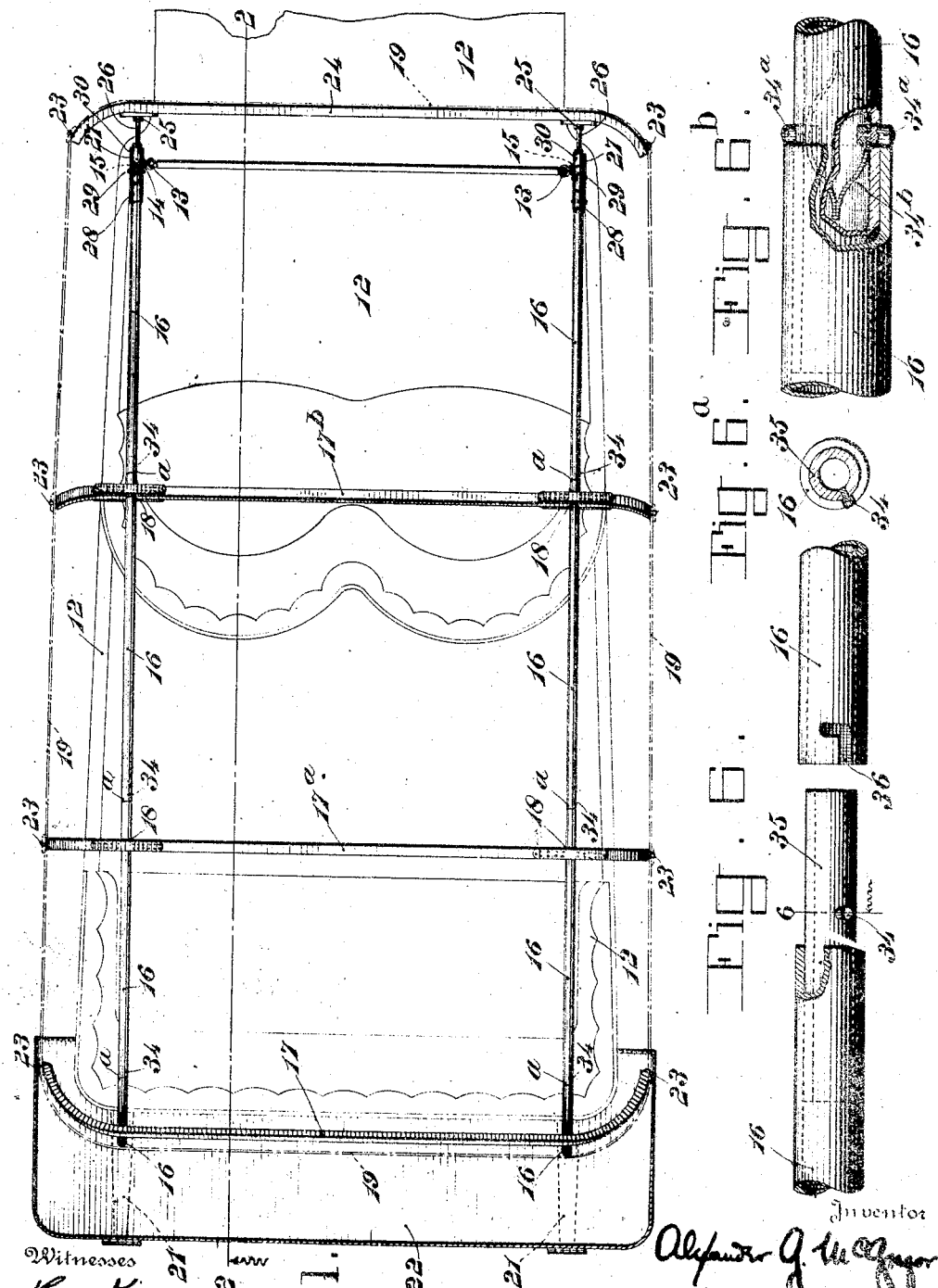

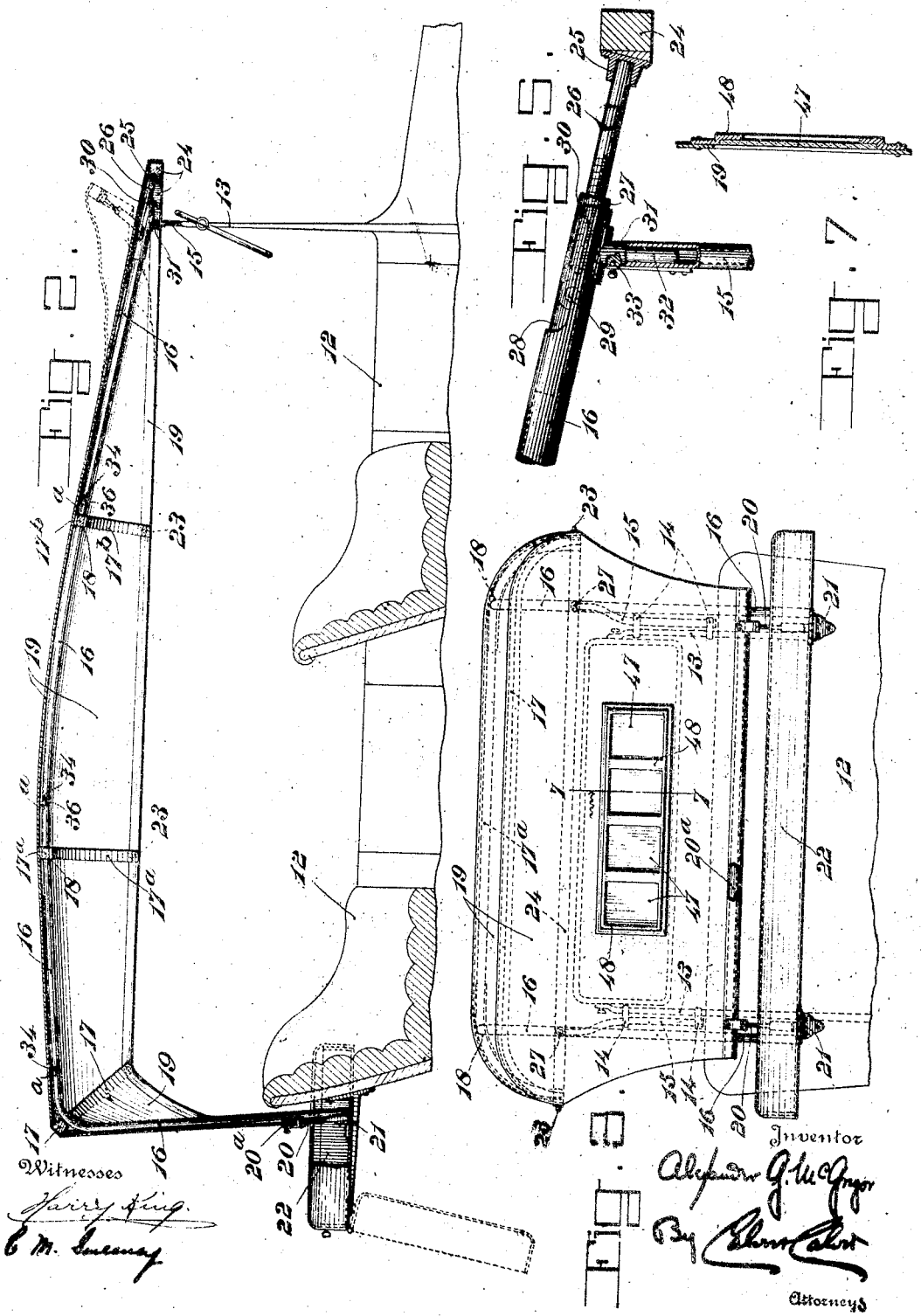

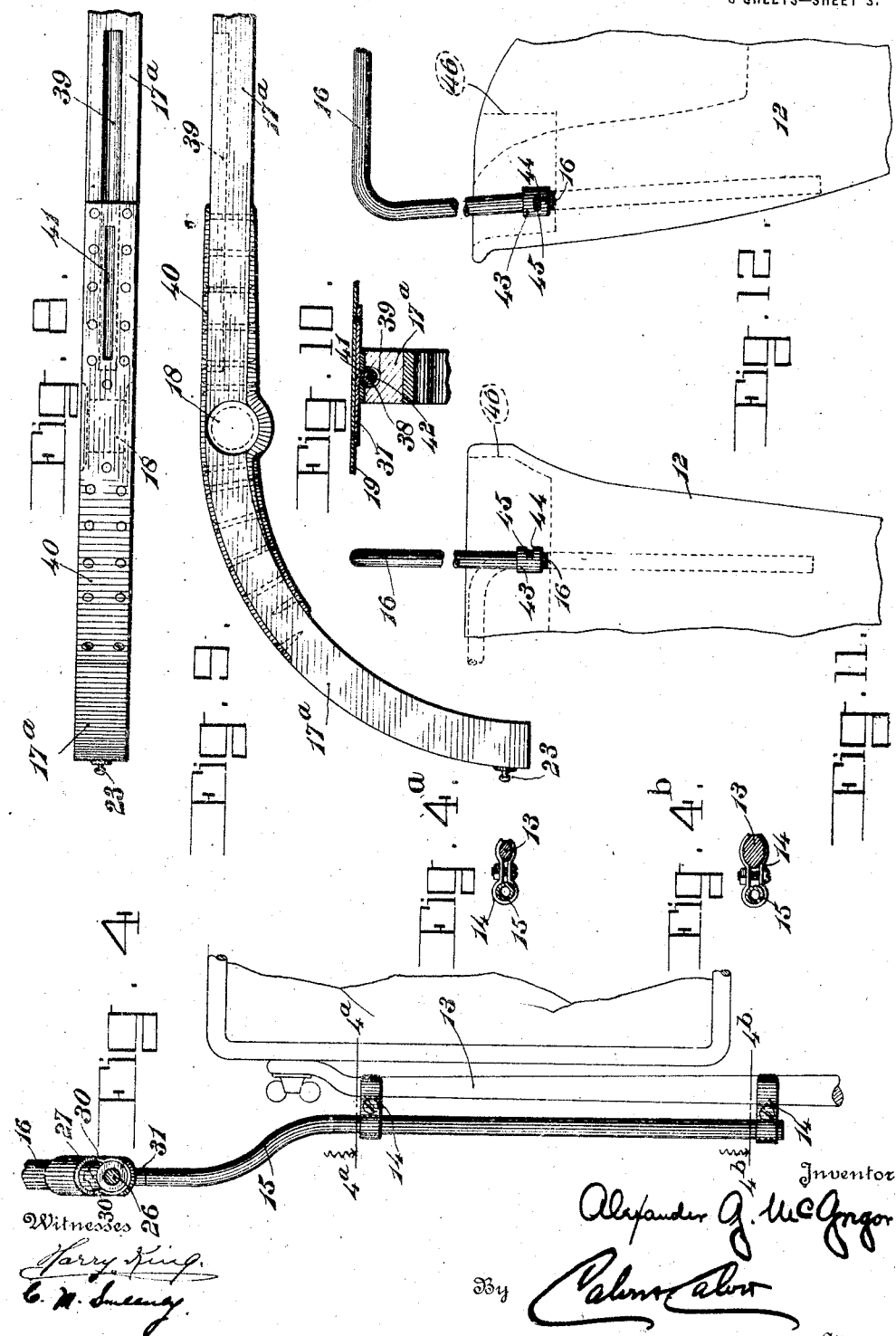

ALEXANDER G. McGREGOR, OF GLOBE, ARIZONA.

VEHICLE-TOP.

1,191,446.  Specification of Letters Patent.  Patented July 18, 1916.

Application filed December 4, 1914. Serial No. 875,536.

*To all whom it may concern:*

Be it known that I, ALEXANDER G. McGREGOR, a citizen of the United States, residing at Globe, in the county of Gila and State of Arizona, have invented or discovered certain new and useful Improvements in Vehicle-Tops, of which the following is a specification, reference being had therein to the accompanying drawings.

This invention relates to a dismountable canopy top or cover for automobiles or other road vehicles, or for boats, and has for its object to provide a top which may be readily and easily put up or taken down by one person, which, when up, will have no obstructing bows to the sides, thus leaving a clear view from either side, and which will include a dust-proof receptacle in which the top or cover may be stored when down, and which receptacle will be close to the rear of the vehicle, thus avoiding the objections to the ordinary folded tops of vehicles, which project at some distance behind the vehicles, thus subjecting the folded tops to such strain as sometimes breaks the bows at their points of support, and which on account of their construction are not fully inclosed in a dust-proof receptacle, and often become very unsightly when folded.

In the accompanying drawings Figure 1 is a plan view of an automobile provided with the present invention. Fig. 2 is a sectional view of the upper portion of the same on line 2—2, Fig. 1. Fig. 3 is a rear view of the upper portion of the same. Fig. 4 is a detail view showing a convenient manner of mounting one of the front supports of the top on one of the wind shield supports. Figs. 4ª and 4ᵇ are sections on lines 4ª and 4ᵇ, respectively, of Fig. 4. Fig. 5 is a detail view illustrating a preferred construction of the front end of the top or cover. Fig. 6 is a detail view showing a detachable connection of parts of one of the longitudinal or main supporting tubes, and Fig. 6ª is a section on line 6 of Fig. 6. Fig. 6ᵇ is a detail view showing a modified form of jointed connection of a longitudinal tubular bar. Fig. 7 is an enlarged detail section of a part of the rear portion of the cover on line 7—7, Fig. 3. Figs. 8 and 9 are partial top and side views, respectively, of a preferred form of one of the cross bars or bows, and Fig. 10 is a cross section of the same showing means for removably securing the flexible cover thereto. Figs. 11 and 12 illustrate a modified form of rear support for the main bars or tubes of the cover frame.

Referring to the drawings, 12 denotes a portion of an automobile body having a wind shield support 13, of any suitable or well-known construction, at its forward end. Suitably attached to said wind shield support, as by clamps 14 (see Fig. 4) are uprights 15 which are preferably tubular in construction, and which serve to sustain the forward ends of the main or longitudinal bars or tubes 16 of the cover frame, said main bars or tubes having downturned rear ends suitably supported at the rear portion of the vehicle, as by being mounted on the rear seat, or otherwise. Mounted on the main bars 16 are cross bars or bows 17ª and 17ᵇ which are preferably provided with eyes 18 encircling the said bars 16, said eyes being preferably lined with soft material, as denoted by dotted lines in Fig. 9, to prevent scratching the longitudinal bars or tubes 16. Also resting on the upper sides of the curved rear ends of the main tubes or bars 16 is a cross bar or bow 17. The cross bars or bows 17ª and 17ᵇ may, if desired, rest slidingly on the main bar 16 like the cross bar or bow 17.

A flexible canopy top or cover 19, of waterproof cloth or other suitable material, is attached at its rear end to forks at the upper ends of small rods 20 which are threaded for the adjustment of said forks and which have hinged or pivoted connections at their lower ends with suitable supports, as brackets 21, mounted at the back of the rear seat of the vehicle. This rear end of the flexible cover 19 is provided with a thin crosswise strip of metal 20ª to stiffen the same and distribute the tension on the said cover. The brackets 21 support a box or receptacle 22 into which the top may be folded, as will be hereinafter explained, the said box or receptacle comprising a hinged cover which, when closed, will make the said box or receptacle dust-proof; the said cover being adapted to be turned down, as indicated in dotted lines in Fig. 2, when access to the said box or receptacle is desired. The flexible cover 19 may be attached at its sides to the cross bars or bows 17, 17ª and 17ᵇ, in any suitable manner, preferably by means of snap fastenings comprising ball studs, as 23, the said cover being secured at its forward end in any suitable manner to a front cross bar or bow 24. The said front cross bar or bow 24 is provided with sockets 25 which receive the forward ends of rods 26 preferably having screw threaded connections with blocks 27 which are in turn attached to blocks 28 mounted at the front ends of the main bars 16, the said blocks 27 being hinged, by means of pivots 29, to the said blocks 28. The main tubular bars 16 are provided at their extreme forward ends with thin portions 30 which will serve as spring clips to hold the blocks 27 in their working positions.

Owing to the construction just described it will be understood that the forward end of the flexible canopy top or cover 19, and the parts by which it is carried, may be turned up, as indicated in dotted lines in Fig. 2, and thus when the said canopy top is being adjusted to working position it will first be drawn well forward, with its front end raised, and when forced down the hinged connection of the supports for the forward end of the said flexible canopy top or cover will act somewhat as a toggle in stretching the same taut to working position, as will be readily understood. The flexible top or cover may thus be stretched more or less tightly on its supports, according to the adjustment of the rods 26 in the blocks 27.

To the forward ends of the main bars 16 are attached supports 31 having round shanks 32 removably fitting in the upper ends of the forward uprights 15, and held in working positions by means of spring latches 33 attached to the said uprights 15 and engaging the said supports 31 at their upper ends. When the said spring latches are released from engagement with the said supports 31 the latter are free to be lifted with their shanks from the said uprights 15.

The main bars 16 are preferably tubular and made in sections removably connected together in any suitable manner, for example as shown in Fig. 6, by means of pins 34 mounted on short tubular sections 35 fixed to parts of the bars 16 and having bayonet-joint slots 36 in portions of the tubular bars 16, so that sectional portions of the tubular bars 16 may be engaged or disengaged by partial rotations and endwise adjustments of certain portions thereof. Any suitable number of these jointed connections in the main bar 16 may be provided, as indicated at a, a, a, in Fig. 2.

Instead of connecting the sectional bars or tubes 16 together by the construction just described, such connection may be effected by the construction illustrated in Fig. 6$^b$, which shows locking pins 34$^a$ pressed outward by means of springs 34$^b$, so that by forcing the said locking pins 34$^a$ inward one section of a tube 16 may be telescoped within another section thereof.

The flexible canopy top or cover 19 may be attached to the cross bars or bows 17, 17$^a$, 17$^b$, between its sides, in any suitable manner, but such attachment will preferably be effected by providing the said cover with short straps 37 having loops 38 received in grooves 39 in the said cross bars or bows. To this end the said cross bars or bows are preferably provided with metal plates 40 overlying said grooves and having slots 41 through which said loops 38 may be inserted; the grooves 39 being of sufficient length to permit of the insertion of fastening rods or pins 42 in the said loops 38. This mode of attachment allows the cover to move freely, within certain limits, transversely of the said bars or bows, preventing wrinkling which might occur if the cloth were fastened rigidly at these points.

The rear downturned ends of the main or longitudinal bars or tubes 16 may be attached to the back of the rear seat of the vehicle by means of the construction shown in Figs. 11 and 12. This construction comprises collars 43 provided with bayonet-joint slots 44 for the reception of pins 45 on the said main bars or tubes 16, so that when the rear sections of the said main bars are disengaged from the other parts they may be partially turned to disengage the said pins from the horizontal portions of said slots, and they may then be depressed to the lowered positions denoted by dotted lines, and when thus depressed their upper horizontal ends may be received in a receptacle, as 46, at the top of the back of the rear seat of the vehicle. This receptacle, which may be provided with an upholstered cover, might also contain the cross bars or bows 17, 17$^a$ 17$^b$, and the front cross bar or bow 24, to which the said flexible cover is attached, removably or permanently.

The rear depending portion of the flexible cover 19 is preferably provided with mica or isinglass windows 47, the edges of which may be stiffened or strengthened by a sheet metal frame, as 48, which will serve to protect the mica or isinglass when the cover is folded in the receptacle or box 22.

When it is desired to take down the vehicle top the pivotally mounted front end thereof is first turned up, as indicated by dotted lines in Fig. 2, thus slackening the flexible cover so that the sockets 25 on the front bar or bow 24 may be disengaged from the toggle pins 26. The said front cross bar or bow 24 may then be placed on top of the main or longitudinal bars or tubes 16, and the snap fasteners at the ends of the cross bars or bows (if such be used) may then be released. The box or receptacle 22 at the rear of the vehicle being open, the flexible cover 19 may be partly drawn down into the same and folded back and forth until the rear bow 17 comes down and rests at the rear of the said receptacle. The flexible cover is then pulled on down until the second cross bar or bow 17ª rests at the front of the box or receptacle, the cloth making one fold and hanging down outside the receptacle. The flexible cover is then allowed to make another fold outside of the said box or receptacle, and the third cross bar or bow 17ᵇ is pulled down on top of the second bow. The folded cloth or flexible cover between the third bow 17ᵇ and the front bow 24 will make another fold outside of the receptacle. The front cross bar or bow 24 is then pulled down into the box allowing the cloth to fold outside of the box and the said front bar or bow will be allowed to rest directly above the rear bow first folded down into the box. The folds of the flexible cover outside of the box will then be folded over into the same.

If it be desired to take down the framework of the top this may be done by releasing the spring latches 33 from the supports 31, thus allowing the said supports to be lifted out of the front uprights 15. The sectional bars or tubes 16 may then be taken apart and placed in the rear box or receptacle on top of the cover. When it is desired to put up the top the operation just above described, with reference to the manner of taking it down, may simply be reversed.

While it is preferred to make the main bars 16 of the cover frame in jointed sections which can be taken apart, it will be understood that said main bars may be integral or non-jointed if desired, and may, when either jointed or non-jointed, be either tubular or solid bars, although, for lightness and convenience, these main bars will preferably be tubular and made in detachable sections, or jointed. Also while it is preferred to attach the cloth to the bows, allowing said bows to slide on the main bars, it will be understood that the bows may be rigidly attached to the main bars, the whole comprising an overhead framework over which the cloth covering may be stretched, the receptacle being provided at the rear for receiving the cloth when it is not required overhead.

From the foregoing it will be understood that the invention provides a convenient canopy top or cover for automobiles and the like, which may be readily taken down when desired, and folded snugly away in a dust-proof receptacle at the rear of the vehicle. Such vehicle may have one or more seats, and may be either a road vehicle, as an automobile or other wheeled carriage, or a sleigh, or may be a water vehicle, as a motor boat or the like.

Having thus described my invention, I claim:

1. A vehicle top comprising main longitudinal bars rigidly supported at the front and rear parts of the vehicle, cross bars or bows slidingly mounted on said main longitudinal bars, a flexible cover attached to said cross bars or bows, and a receptacle at the rear of the vehicle in which the said cover, in folded condition, together with said cross bars or bows, may be inclosed, combined with means, at the front of the vehicle, for stretching said cover taut, said stretching means comprising a front cross-bar or bow, to which the front end of said cover is attached, and means for pivotally and adjustably connecting said front cross-bar or bow with the forward ends of said main longitudinal bars.

2. A vehicle top comprising main longitudinal bars rigidly supported at the front and rear parts of the vehicle, cross bars or bows slidingly mounted on said main longitudinal bars, a flexible cover attached to said cross bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members and a front cross bar or bow to which the forward end of said cover is attached and which is removably supported by said toggle rods.

3. A vehicle top comprising main longitudinal bars rigidly supported at the front and rear parts of the vehicle, cross bars or bows slidingly mounted on said main longitudinal bars, a flexible cover attached to said cross bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members, a front cross bar or bow, to which the forward end of said cover is attached, and spring clips for removably retaining said toggle rods in working position, and which front cross bar or bow is removably supported by said toggle rods.

4. A vehicle top comprising main longitudinal bars rigidly supported at the front and rear parts of the vehicle, cross bars or bows slidingly mounted on said main longitudinal bars, a flexible cover attached to said cross bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members, and a front cross bar or bow to which the forward end of said cover is attached, said front cross bar or bow being provided with sockets removably receiving the forward ends of said toggle rods.

5. A vehicle top comprising main longitudinal bars formed in detachable sections and rigidly supported at the front and rear parts of the vehicle, cross bars or bows slidingly mounted on said main longitudinal bars, a flexible cover attached to said cross bars or bows, and a receptacle at the rear of the vehicle in which the said cover, in folded condition, together with said cross bars or bows, may be inclosed, said cross bars being provided with grooves and with slotted plates overlying said grooves, and said flexible cover being provided with straps having loops passing through said slotted plates into said grooves and adapted to receive fastening rods or pins.

6. A vehicle top comprising main longitudinal bars rigidly supported at the front and rear parts of the vehicle, cross bars or bows supported by said main longitudinal bars, a flexible cover attached to said cross bars or bows, and a receptacle at the rear of the vehicle in which the said cover, in folded condition, together with said cross bars or bows, may be inclosed, combined with means, at the front of the vehicle, for stretching said cover taut, said stretching means comprising a front cross-bar or bow, to which the front end of said cover is attached, and means for pivotally and adjustably connecting said front cross-bar or bow with the forward ends of said main longitudinal bars.

7. A vehicle top comprising main longitudinal bars rigidly supported at the front and rear parts of the vehicle, cross bars or bows supported by said main longitudinal bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members and a front cross bar or bow to which the forward end of said cover is attached and which is removably supported by said toggle rods.

8. A vehicle top comprising main longitudinal bars rigidly supported at the front and rear parts of the vehicle, cross bars or bows supported by said main longitudinal bars, a flexible cover attached to said cross bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members, a front cross bar or bow, to which the forward end of said cover is attached, and spring clips for removably retaining said toggle rods in working position, and which front cross bar or bow is removably supported by said toggle rods.

9. A vehicle top comprising main longitudinal bars rigidly supported at the front and rear parts of the vehicle, cross bars or bows supported by said main longitudinal bars, a flexible cover attached to said cross bars or bows, and a receptacle at the rear of the vehicle in which the said cover, in folded condition, together with said cross bars or bows, may be inclosed, combined with members pivoted to the front ends of said main longitudinal bars, toggle rods having screw-threaded connections with said pivoted members, and a front cross bar or bow to which the forward end of said cover is attached, said front cross bar or bow being provided with sockets removably receiving the forward ends of said toggle rods.

In testimony whereof I affix my signature, in presence of two witnesses.

ALEXANDER G. McGREGOR.

Witnesses:
L. S. MUSSER,
C. W. CROMWELL.